April 5, 1927.

N. H. SCOTT 1,623,814

SPLIT SPROCKET

Filed July 16, 1926

INVENTOR
Nelson H. Scott
BY
ATTORNEY.

Patented Apr. 5, 1927.

1,623,814

UNITED STATES PATENT OFFICE.

NELSON HOWELL SCOTT, OF LA FAYETTE, GEORGIA, ASSIGNOR OF ONE-HALF TO L. B. DAY OF LA FAYETTE, GEORGIA.

SPLIT SPROCKET.

Application filed July 16, 1926. Serial No. 122,939.

This invention relates to a sprocket construction and pertains particularly to a motion picture film sprocket of the type used in a motion picture projecting apparatus.

The primary object of this invention is the provision, in a manner as hereinafter set forth, of a motion picture film sprocket formed in two sections for the purpose of expediting the application and removal of the sprocket to, or from, a shaft.

The split motion picture film sprocket embodying this invention, is especially adapted for application to the shaft of the intermittent motion mechanism of a picture projecting apparatus. As is well known the shaft of the intermittent motion mechanism of motion picture projecting machines, upon which the film sprocket is ordinarily mounted, is so positioned that in order to remove the film sprocket a partial disassembling of the machine is necessary.

The invention will be best understood from a consideration of the following detailed description taken in connection with the accompanying drawing forming a part of this specification, with the understanding that the invention is not confined to any strict conformity with the showing of the drawing but may be changed and modified so long as such changes and modifications mark no material departure from the salient features of the invention as expressed in the appended claim.

In the drawing:—

Figure 1:
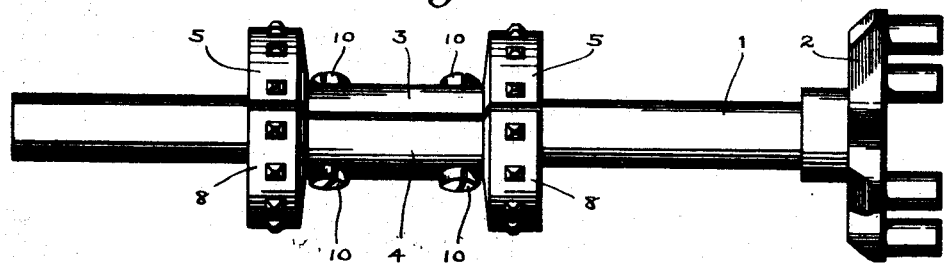
Figure 1 shows in side elevation, the shaft of an intermittent stop mechanism of a particular type, for motion picture machines and carrying thereon the split film sprocket embodying this invention.
Figure 2:
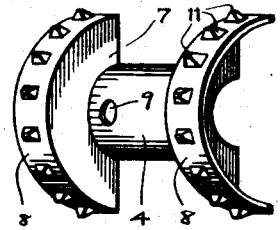
Figure 2 shows one half of the sprocket embodying this invention.
Figure 3:
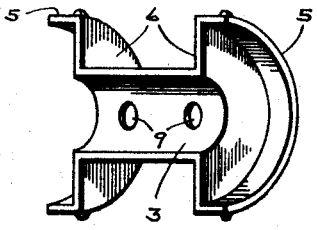
Figure 3 shows the inner side of the other half of the sprocket.

Referring now to the drawing in detail wherein like numerals of reference indicate corresponding parts throughout the several views, the numeral 1 indicates a shaft having the head 2 of an intermittent motion mechanism, upon one end thereof.

Applicant's device is not limited to use upon an intermittent motion mechanism of the type herein shown but is designed to be used in any position where considerable time and trouble would be expended in mounting sprockets of the type ordinarily used.

The drum sprocket embodying this invention comprises a central sleeve portion split longitudinally to set up the sleeve halves 3 and 4. The half 3 has formed at each end thereof a relatively broad semi-circular wheel rim 5 having the web 6 connecting it to its respective end of the sleeve half.

The other sleeve half 4 has extending from each end thereof similarly formed webs 7 each carrying a semi-cylindrical wheel rim 8, like the wheel rims 5 carried upon the sleeve half 3.

Each of the sleeve halves 3 and 4 has a pair of apertures 9 formed therethrough and when the sleeves are in the position shown in Figure 1, in alignment upon the shaft 1, securing screws 10 are passed through the apertures 9 into the shaft 1 to hold the sleeve halves 3 and 4 in proper aligned position thereon.

Each of the wheel rim halves 5 and 8 has formed upon and extending from the peripheral surface thereof the spaced studs 11 which, when the halves are in proper position as in Figure 1, form a complete line about the entire peripheral surface of each complete wheel rim portion. These studs, as is well known, engage in the apertures formed in the film, as the film passes over the sprocket wheel.

Having thus described my invention what I claim is:—

A film sprocket wheel of the character described, comprising a hub sleeve split longitudinally to form two sections, a semi-circular web extending outwardly from each end of each of said sections, a semi-circular wheel rim formed at the outer edge of each of said webs, means whereby said sleeve halves may be secured in longitudinal edge opposed relation about a shaft, and film engaging studs formed upon the periphery of said rim halves for the engagement of a rim passing over said halves.

In testimony whereof, I affix my signature hereto.

NELSON H. SCOTT.